(12) United States Patent
Tanki

(10) Patent No.: US 12,343,727 B2
(45) Date of Patent: Jul. 1, 2025

(54) CONTROL SYSTEM FOR A LIQUID FILLING LEVEL AND MICROSCOPE STAGE INCLUDING SUCH A SYSTEM

(71) Applicant: Leica Mikrosysteme GmbH, Vienna (AT)

(72) Inventor: Siegfried Tanki, Vienna (AT)

(73) Assignee: LEICA MIKROSYSTEME GMBH, Vienna (AT)

( * ) Notice: Subject to any disclaimer, the term of this patent is extended or adjusted under 35 U.S.C. 154(b) by 432 days.

(21) Appl. No.: 17/902,940

(22) Filed: Sep. 5, 2022

(65) Prior Publication Data
US 2023/0109559 A1  Apr. 6, 2023

(30) Foreign Application Priority Data

Sep. 30, 2021 (EP) .................................... 21200339

(51) Int. Cl.
*B01L 7/00* (2006.01)
*G02B 21/26* (2006.01)
*G05B 19/4155* (2006.01)
*G05D 9/12* (2006.01)

(52) U.S. Cl.
CPC ................ *B01L 7/50* (2013.01); *G02B 21/26* (2013.01); *G05B 19/4155* (2013.01); *G05D 9/12* (2013.01); *B01L 2200/0605* (2013.01); *B01L 2300/0663* (2013.01); *B01L 2300/1894* (2013.01); *G05B 2219/35123* (2013.01)

(58) Field of Classification Search
None
See application file for complete search history.

(56) References Cited

U.S. PATENT DOCUMENTS

| | | | |
|---|---|---|---|
| 3,938,347 A | 2/1976 | Riedel et al. | |
| 3,969,013 A | 7/1976 | Poty et al. | |
| 6,596,081 B1 * | 7/2003 | Arnowitz | B01D 9/0054 117/69 |
| 9,810,566 B2 | 11/2017 | Eshchenko et al. | |
| 10,144,010 B2 | 12/2018 | Lihl et al. | |
| 2006/0102842 A1 * | 5/2006 | Hoehne | G01T 1/16 250/336.2 |

(Continued)

FOREIGN PATENT DOCUMENTS

| | | |
|---|---|---|
| FR | 2763124 A1 | 11/1998 |
| WO | WO 2016/016000 A1 | 2/2016 |

*Primary Examiner* — Hua Lu
(74) *Attorney, Agent, or Firm* — LEYDIG, VOIT & MAYER, LTD.

(57) ABSTRACT

A system for controlling a filling level of a reservoir filled with a liquid includes the reservoir configured to be filled with the liquid at least up to a maximum filling level. The system also includes a probe including a probe body, at least a section of the probe body extending, in a height dimension of the reservoir, from a first position to a second position, the first position being lower than the second position, and the second position being above the maximum filling level, and further including a temperature dependent sensor configured to generate a sensor signal based on a temperature at the second position, the temperature depending on the filling level. The system also includes a controller for controlling the filling level of the reservoir depending on the sensor signal such that the filling level is kept constant.

14 Claims, 3 Drawing Sheets

(56) References Cited

U.S. PATENT DOCUMENTS

| | | | | |
|---|---|---|---|---|
| 2007/0251960 | A1* | 11/2007 | Al-Misfer | C01B 17/0243 374/E1.018 |
| 2008/0016960 | A1* | 1/2008 | Zimmermann | G01F 23/22 73/295 |
| 2009/0223289 | A1* | 9/2009 | Krammer | G01F 23/246 73/290 R |
| 2010/0147674 | A1* | 6/2010 | Krivoshlykov | H10F 39/011 204/157.4 |
| 2010/0220311 | A1* | 9/2010 | Hall | F25B 19/005 62/62 |
| 2010/0247506 | A1* | 9/2010 | Johnston | A61K 9/1682 424/94.4 |
| 2010/0263096 | A1* | 10/2010 | Jahnke | G01Q 30/14 422/402 |
| 2012/0292507 | A1* | 11/2012 | Morikawa | G01N 1/2813 250/307 |
| 2013/0253491 | A1* | 9/2013 | Burr | A61B 18/0218 606/21 |
| 2015/0253355 | A1* | 9/2015 | Grinolds | G01R 33/60 850/40 |
| 2015/0378261 | A1* | 12/2015 | Englund | C09K 13/00 216/94 |
| 2017/0227752 | A1 | 8/2017 | Lihl et al. | |
| 2017/0370814 | A1* | 12/2017 | Gaechter | H01J 37/20 |
| 2018/0058990 | A1 | 3/2018 | Deshmukh | |
| 2020/0299169 | A1* | 9/2020 | Cosneau | C03B 9/41 |
| 2021/0239631 | A1* | 8/2021 | Huang | G01N 24/08 |
| 2022/0364144 | A1* | 11/2022 | Polyakov | C12N 11/14 |
| 2023/0042239 | A1* | 2/2023 | Gebhardt | G01F 23/266 |

* cited by examiner

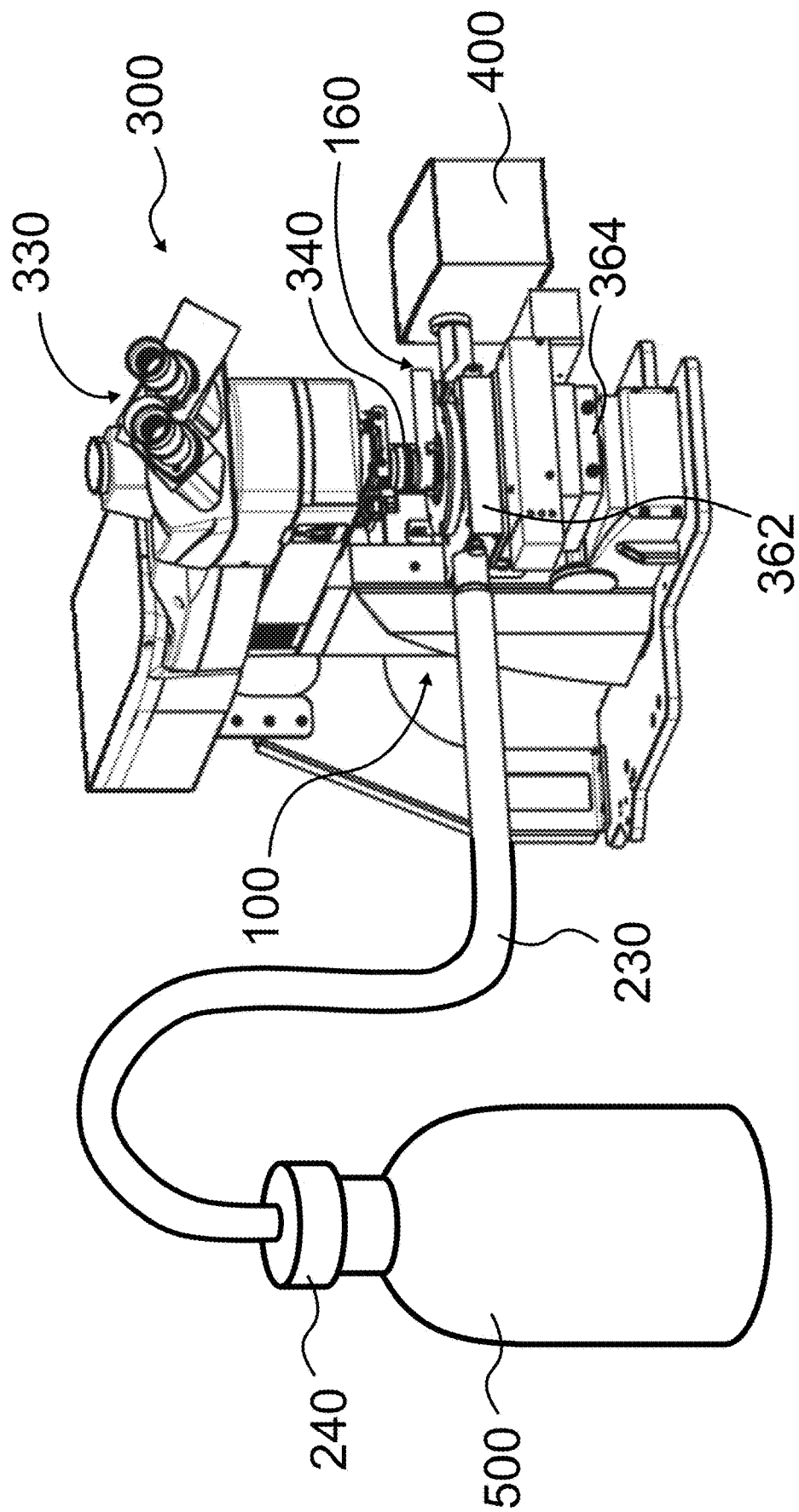

CONTROL SYSTEM FOR A LIQUID FILLING LEVEL AND MICROSCOPE STAGE INCLUDING SUCH A SYSTEM

CROSS REFERENCE TO RELATED APPLICATIONS

This application claims benefit to European Patent Application No. EP 21200339.6, filed on Sep. 30, 2021, which is hereby incorporated by reference herein.

FIELD

The present inventive concept relates to a system for controlling a filling level of a reservoir filled with a liquid, and to a microscope stage of a microscope including such a system. More particularly, the system can be used for controlling a filling level of a cryogenic liquid, particularly in a reservoir of a microscope stage used in the field of cryo-microscopy.

BACKGROUND

Cryo-microscopy in the meaning of the present application particularly includes cryo-light microscopy and cryo-electron microscopy. Samples to be examined by cryo-microscopy are mostly prepared beforehand by a method called cryofixation. In this method, a water-containing sample is frozen very quickly (cryofixed) to a temperature of less than −150° C., i.e. it is cooled very rapidly in order to avoid the formation of ice crystals. Cryofixation has proven to be particularly suitable for investigations of structural biology. The objects to be investigated, for example cells, enzymes, viruses, or lipid layers, thereby become embedded in a thin, vitrified ice layer. The great advantage of cryofixation is that the biological structures can be obtained in their natural state. For example, a biological process can be halted at any point in time by cryofixation, and investigated in that vitrified state, for example in a cryo-electron microscope but also in a light microscope with corresponding sample cooling. In this context, cryo-light microscopy serves principally to locate relevant regions of the sample (regions of interest), which can be noted and then re-localised and viewed in more detail in a cryo-electron microscope.

In order not to impair the quality of the frozen samples, it is very important that they be transferred in cooled and contamination-free, particularly water-free, fashion between the processing units being used, for example a cryofixation device, a freeze fracture apparatus, and a coating apparatus, and the analytical devices, in this case principally a cryo-light microscope and a cryo-electron microscope. Sample transfer devices, such as disclosed in U.S. Pat. No. 10,144,010 B2, can be used to transfer a sample under cryogenic conditions between said processing units and/or analysing units.

As already pointed out above, the samples to be examined need to be processed constantly under cryogenic conditions. Contamination or devitrification reduce dramatically the success rate of the workflow. In order to identify the region of interest before starting the time-consuming and expensive cryogenic-electron microscopy (cryo-EM) step such as scanning electron cryo-microscopy (cryoSEM), transmission electron cryo-microscopy (cryoTEM) or electron cryotomography (cryoET), cryo-light microscopy is typically applied. By using the cryo-light microscopy, a region of interest in the nanometre range can be identified within a cell volume (millimetre range). The region of interest is then retraced in the cryo-EM such that the analysing process is highly accelerated. To this end, the light microscope, at least the light microscope stage, has to be used under cryogenic conditions. The samples, typically on a sample carrier, also known as sample grid, are loaded into a sample transfer device, also known as cryo-CLEM ("cryo-light-electron-microscopy") shuttle and then transferred into the cryo-stage of the light microscope.

The cryo-stage of the light microscope preferably comprises a cryogenic liquid refilling vessel, typically a Dewar vessel for liquid nitrogen, connected to the cryo-stage. WO 2016/016000 A1 suggests use of internal cooling of components of the microscope stage by tubes conveying a flow of cryogenic liquid (liquid nitrogen). The inventors of the present inventive concept recognize, however, that to avoid temperature variations it is necessary to provide a constant cryogenic liquid flow. In practice, however, the cryogenic pump delivering cryogenic liquid from a refilling Dewar vessel, only delivers variable amounts of cryogenic liquid, particularly in case of low flow rates. On the other hand, the temperature sensors used in such a known cryo-stage detect temperature deviations very fast. This can lead to problems of the corresponding feedback control and to a wave-like temperature behaviour.

SUMMARY

In an embodiment, the present disclosure provides a system for controlling a filling level of a reservoir filled with a liquid. The system includes the reservoir configured to be filled with the liquid at least up to a maximum filling level. The system also includes a probe including a probe body, at least a section of the probe body extending, in a height dimension of the reservoir, from a first position to a second position, the first position being lower than the second position, and the second position being above the maximum filling level, and further including a temperature dependent sensor configured to generate a sensor signal based on a temperature at the second position, the temperature depending on the filling level. The system also includes a controller for controlling the filling level of the reservoir depending on the sensor signal such that the filling level is kept constant.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 3 schematically shows a microscope with a microscope stage having a system according to the present inventive concept.

DETAILED DESCRIPTION

Figure 1:
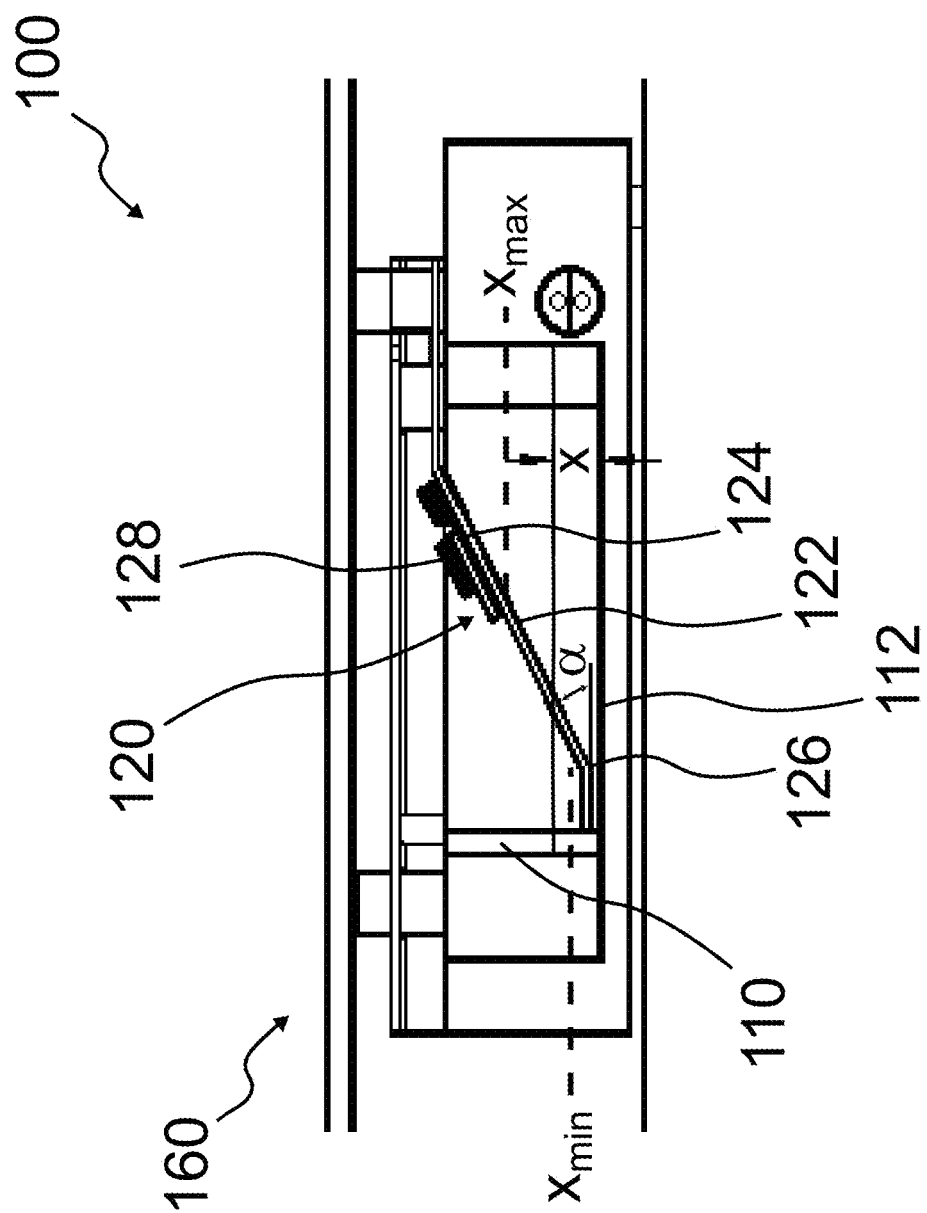
FIG. 1 schematically shows an embodiment of a system according to the present inventive concept.

In view of the problems described above, inventors of the present invention recognize that there is a need for an improved temperature control of samples in a cryo-stage of a cryo-microscope. While certain applications in cryo-microscopy have been described above, other applications can be envisaged, particularly other applications where another liquid filled into a reservoir is used.

In an embodiment the present inventive concept provides a system for controlling a filling level of a reservoir filled with a liquid, particularly a cryogenic liquid, particularly to be used in a cryo-stage of a cryo-microscope, the use of it minimizing the risk of contamination or devitrification and a possibly resulting drift of the sample. In general, embodiments of the present inventive concept can be used for controlling a filling level of a reservoir filled with other kinds of liquids in other applications.

Embodiments of the present inventive concept provide a system for controlling a filling level of a reservoir filled with a liquid. The system comprises the reservoir configured to be filled with liquid at least up to a maximum filling level; a probe including a probe body, at least a section of the probe body extending, in a height dimension of the reservoir, from a first position to a second position, the first position being lower than the second position, and the second position being above the maximum filling level, and further including a temperature dependent sensor configured to generate a sensor signal based on a temperature at the second position, the temperature depending on the filling level; the system further comprises a controller for controlling the filling level of the reservoir depending on the sensor signal such that the filling level is kept constant.

In the words of the above discussed application of a cryo-stage, the system according to the present inventive concept controls the cryogenic liquid level in the reservoir of the cryo-stage depending on the sensor signal such that the filling level of cryogenic liquid within the reservoir is kept constant. As a result of this, a constant temperature at the second position is achieved, which in turn guarantees a constant temperature at the sample location, which typically is above and close to the second position. Thus, the risk of devitrification, contamination and of a possibly resulting drift of the sample is minimized.

Embodiments of the present inventive concept can be used for other applications where a temperature at a position above the maximum filling level of a liquid in a reservoir depends on the respective filling level of this liquid in the reservoir. By keeping the filling level constant, a constant temperature at this position can be achieved.

The temperature dependent sensor may be in contact with the second position or may be a contact-free sensor generating a signal based on a temperature at the second position. This temperature may be the temperature of the surrounding of the second position, e.g. the temperature of the vaporized cryogenic liquid at the second position, or the temperature of the probe body at the second position, or—depending on the arrangement and on the kind of the sensor, a temperature determined by the temperature of the probe body at the second position and the surrounding gas temperature.

It should be noted that the sensor signal can be calibrated such that the system is able to either determine a filling level depending on the detected sensor signal or, vice versa, for determining a temperature at the second position depending on the filling level present in the reservoir. In case of a cryo-stage of a microscope having the system according to the present inventive concept, the higher the filling level of cryogenic liquid, the colder the temperature at the sensor. The temperature dependent sensor can e.g. be calibrated a predetermined number of degrees higher than the temperature at the boiling point (evaporation temperature) of the cryogenic liquid such that the controller can keep the level of cryogenic liquid in the reservoir at a constant desired level.

It is preferred if the relation between the temperature dependent sensor signal and the filling level is a linear relation. Such a linear relationship can be realised in a system according to the present inventive concept by selection of suitable materials of the probe body, its arrangement in the reservoir, and by using suitable temperature dependent sensors as will be discussed below.

In an embodiment, the first position on the probe body is located at or below a minimum filling level. Especially in case of a thermally conductive probe body the temperature at the second position immediately drops when the filling level reaches the first position on the probe body. Therefore, in this case, it is sufficient to locate the first position on the probe body at a minimum filling level.

In an embodiment, in a height dimension of the reservoir, the first position is laterally offset in relation to the second position. In other words, the probe body extends diagonally through at least a part of the interior of the reservoir. In a projection onto a horizontal plane (as when seen from above), the probe body has a length according to the lateral displacement. In a projection onto a vertical plane, the length of the probe body is equal to or less than the length of the probe body itself. By this arrangement, the length of the probe body being immersed in the liquid can be greater than the maximum filling level. This improves the accuracy of the sensor signal. In this context, it is preferred if the probe body extends, in a width dimension of the reservoir, through a major part of the reservoir, i.e. through more than 50% of the width of the reservoir. This increases the length of the probe body and thus the dynamic range and the accuracy of the temperature depending signal and thus the accuracy of controlling the filling level to be constant.

In this embodiment, it is preferred if an inclination angle of the probe body in relation to a bottom side of the reservoir is equal to or less than 65° or 55° or 45° or 35° or 25°. An essentially diagonal arrangement of the probe body in the reservoir can be achieved by such inclination angles. A minimum inclination angle depends on the relation between a maximum width dimension of the reservoir and a height of the reservoir, the probe body extending diagonally from a bottom part of the reservoir to a top part of the reservoir on the other side.

In an embodiment, the probe body is in the form of a beam or a rod or a wire or a sheet. The exact form typically also depends on the space requirements within the reservoir and the material used. It is preferred if the probe body is made of metal, particularly of steel, more particularly of X5CrNi18-10 (also referred to as 1.4301). The thermal conductivity of such a steel should not be exceeded by another material used for the probe body in order to be able to maintain a linear correlation between temperature dependent sensor signal and the filling level. Further, a greater dynamic range can be achieved by using a probe body material of a lower thermal conductivity.

In an embodiment, the probe body is reinforced in a section above the maximum filling level. Such a reinforcement has been proven useful in view of a higher accuracy and dynamic range of the correlation between temperature dependent sensor signal and filling level.

In an embodiment, the temperature dependent sensor is mounted to the probe body at the second position of the probe body, and, in particular, detects a temperature at the second position on the probe body. In this embodiment, it is useful to use a thermally conductive probe body having the above discussed specifications. Further, it is preferred to use a resistant thermometer as the temperature dependent sensor. A suitable resistant thermometer, for instance, is a PT1000-sensor for measuring a resistance value depending on the temperature at its location at the second position. This temperature depends on the temperature of the probe body at the second position and of the surrounding gas at the second position.

In an embodiment, the system according to the present inventive concept further comprises a supply line for supplying liquid into the reservoir, and a flow regulator for regulating the flow rate of the liquid into the reservoir, the controller being connected to the temperature dependent sensor and to the flow regulator for controlling the filling level of the reservoir by regulating the flow rate of the liquid into the reservoir depending on the sensor signal. The flow regulator can comprise a motor-driven pump and/or a control valve. Such a flow regulator can be arranged in the supply line or between a liquid refilling vessel (like a Dewar vessel) and the supply line. The controller receives the temperature dependent sensor signals and, in case of a deviation of a set value, controls the flow regulator accordingly to increase or decrease the flow rate of liquid. Thus, by controlling the sensor signal to be equal to a set value, the filling level in the reservoir can be kept constant.

As already discussed above, it is preferred if the liquid is a cryogenic liquid.

Further, embodiments of the present inventive concept also relate to a microscope stage of a microscope, particularly of a cryo-microscope, including the system of the present inventive concept as discussed above. All features relating to the system of embodiments of the present inventive concept as discussed above are also applicable in connection with a microscope stage, particularly a cryo-stage, according to this other aspect of the present inventive concept.

It should be noted that the above features of the embodiments of the inventive concept can—wholly or in part—be combined to achieve other embodiments still falling under the scope of the present inventive concept.

As used herein, the term "and/or" includes any and all combinations of one or more of the associated listed items and may be abbreviated as "/".

Although some aspects have been described in the context of an apparatus, system or device, it is clear that these aspects also represent a description of a method of operating such an apparatus, system or device.

Further embodiments and advantages of the present inventive concept are described below in connection with the following figures.

In the following, the figures are described comprehensively, with the same reference signs designating the same or at least structurally identical components.

FIG. 1 schematically shows a part of a microscope stage 160, more precisely a part of the cryo-stage 362 as shown in more detail in FIG. 3. The cryo-stage is adapted to receive a sample, typically a vitrified sample on a sample grid, which sample is examined by light microscopy to locate relevant regions of the sample, which are then viewed in more detail in a cryo-electron microscope.

The cryo-stage of FIG. 1 comprises a system 100 according to the present inventive concept. This system 100 comprises a reservoir 110 filled with a cryogenic liquid, in particular liquid nitrogen, up to a filling level X. In principle, the reservoir 110 is configured to be filled with cryogenic liquid at least up to a maximum filling level $X_{max}$. A probe 120 is arranged in the reservoir 110, the probe 120 comprising a probe body 122 and a temperature dependent sensor 128. The probe body 122 extends from a lower first position 126 (at least) to a higher second position 124, the second position 124 being above the maximum filling level $X_{max}$. The system 100 further comprises a controller 250 (see FIG. 2) for controlling the filling level X of the reservoir 110 depending on the sensor signal of the temperature dependent sensor 128 such that the filling level X is kept constant.

As can be seen from FIG. 1, in a height dimension of the reservoir 110, the second position 124 is laterally offset in relation to the first position 126 (and vice versa). In other words, the probe body 122 extends diagonally through at least a part of the reservoir, in its width dimension. In the projection onto the vertical plane of the drawing plane of FIG. 1, the probe body 122 is shown in its entire length. In the projection onto the vertical plane perpendicular to the drawing plane, the probe body 122 would be visible in a shorter length (in the embodiment of FIG. 1, the projected length would be approximately equal to the height of the reservoir). In a projection onto a horizontal plane, the length of the probe body 122 corresponds to the lateral displacement of the second position 124 in relation to the first position 126. In the above explanations, the term "the length of the probe body" refers to the length of the section of the probe body from the first position 126 to the second position 124.

The diagonal arrangement of the probe body 122 through a major part of the reservoir 110, in its width dimension, increases the sensing surface of the thermally conductive probe body 122, and thus the dynamic range and the accuracy of the temperature depending sensor signal in relation to the filling level X.

The minimum filling level $X_{min}$ may, in principle, be set arbitrarily, and may correspond to the height of the first position 126. In the embodiment shown in FIG. 1, the first position 126 on the probe body 122 is located below the minimum filling level $X_{min}$.

The system 100 of FIG. 1 is suited to keep the filling level X constant by measuring a temperature (or any other temperature dependent signal) at the second position 124. As this temperature decreases with an increasing filling level of cryogenic liquid in the reservoir 110, a calibration of the sensor signal can be used to determine the filling level X. As soon as the desired filling level is reached, the temperature dependent sensor is calibrated at the corresponding temperature at the second position 124, which temperature is used as a set value for the controller 250 (see FIG. 2). As soon as the actual value of the measured temperature (or another temperature dependent sensor signal) exceeds the set value, the filling level X of the reservoir is increased until the set value is reached again.

Figure 2:
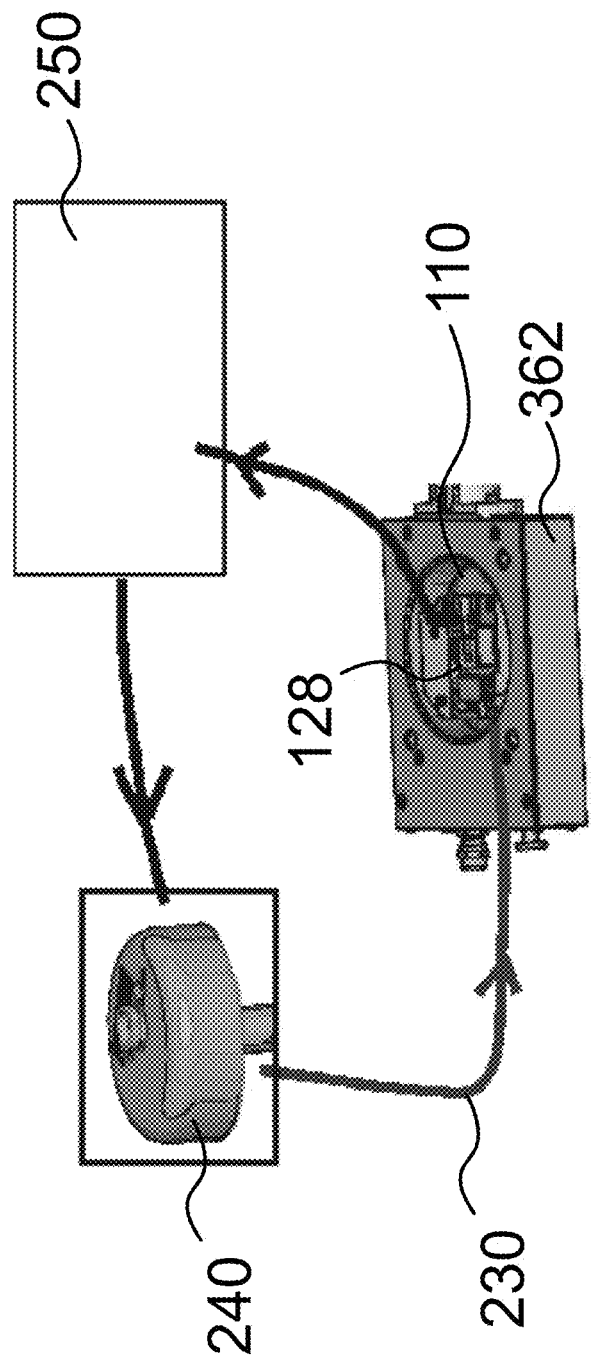
FIG. 2 schematically shows another embodiment of a system according to the present inventive concept.

FIG. 2 schematically shows the arrangement of the microscope stage 160, particularly the cryo-stage 362, the controller 250 and a flow regulator 240 implementing the above described regulation method. The temperature dependent sensor 128 is connected to the controller 250 to transmit the temperature dependent sensor signal to the controller 250. The controller decides whether or not the actual value of the sensor signal exceeds the set value, e.g. by a predetermined threshold value. If yes, the controller 250 initiates the flow regulator 240 to pump liquid nitrogen from a liquid nitrogen refilling vessel into the supply line 230 as shown in FIG. 2. This will cause the temperature dependent sensor signal to decrease again below said threshold value such that the controller 250 causes the flow regulator 240 to stop further pumping of liquid nitrogen.

In this embodiment, the probe body 122 is made of steel, particularly of X5CrNi18-10. As can be seen from FIG. 1, the probe body 122 is reinforced over its length above the maximum filling level $X_{max}$. This further increases the sensing area of the probe 120. The temperature dependent sensor 128 in this embodiment is a PT1000-sensor, the resistance of which depends on the temperature at the second position 124. The arrangement shown in FIG. 1 yields an approximately linear correlation between the sensor signal and the filling level X.

FIG. 3 schematically shows a microscope 300 comprising a microscope stage 160 including the system 100 as discussed above. The microscope 300 comprises a microscope stage 160, the microscope stage 160 comprising a cryo-stage 362 and a positioning table 364 for moving the cryo-stage 362 in the x-y-z directions. The microscope 300 further comprises a microscope objective 340 and an eyepiece 330. The microscope 300 further comprises other components, which are not described herein as being less relevant to embodiments of the present inventive concept. The microscope 300 is a cryo-light microscope having a cryo-stage 362 for receiving a sample to be examined in the microscope 300. To this end, a shuttle 400 can be connected to the cryo-stage 362. The shuttle 400 comprises a vitrified sample on a transfer rod. In its retracted position, the vitrified sample is located in a loading position under cryogenic temperatures. The shuttle 400 can be connected to the cryo-stage 362 and, by sliding the transfer rod along its longitudinal direction, the sample can be transferred into the cryo-stage 362 under cryogenic conditions. In the cryo-stage 362, the sample, typically on a sample holder, is located in its examining position. In order to maintain the necessary cryogenic conditions, the system 100 is operated as explained above. A Dewar vessel 500 stores a sufficient amount of liquid nitrogen, which can be pumped via a flow regulator 240 into the supply line 230. The supply line 230 is insulated to avoid heating of the liquid nitrogen inside the supply line 230. The flow regulator 240 is operated according to the principles explained in connection with FIG. 2 in order to pump the necessary amount of liquid nitrogen from the inside of the Dewar vessel 500 into the reservoir 110 inside the cryo-stage 362 in order to maintain a constant filling level inside the reservoir 110. By examining the sample with the microscope 300, a region of interest in the nanometre range can be identified within a small volume (millimetre range) of the sample. This region of interest is then retraced in a cryo-electron microscope for high resolution imaging.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS 100 system
110 reservoir
112 bottom side
120 probe
122 probe body
124 second position
126 first position
128 temperature dependent sensor
160 microscope stage
230 supply line
240 flow regulator
250 controller
300 microscope
330 eyepiece
340 microscope objective
362 cryo-stage
364 positioning table
400 shuttle
500 Dewar vessel
α inclination angle
X filling level
$X_{min}$ minimum filling level
$X_{max}$ maximum filling level

The invention claimed is:

1. A system for controlling a filling level of a reservoir filled with a liquid, the system comprising:
   the reservoir configured to be filled with the liquid at least up to a maximum filling level;
   a probe including a probe body, at least a section of the probe body extending, in a height dimension of the reservoir, from a first position to a second position, the first position being lower than the second position, and the second position being above the maximum filling level, and further comprising a temperature dependent sensor configured to generate a sensor signal based on a temperature at the second position, the temperature depending on the filling level; and
   a controller for controlling the filling level of the reservoir depending on the sensor signal such that the filling level is kept constant.

2. The system according to claim 1, wherein the first position on the probe body is located at or below a minimum filling level.

3. The system according to claim 1, wherein the first position is laterally offset in relation to the second position.

4. The system according to claim 3, wherein the probe body extends, in a width dimension of the reservoir, through a major part of the reservoir.

5. The system according to claim 3, wherein an inclination angle of the probe body in relation to a bottom side of the reservoir is equal to or less than 65°.

6. The system according to claim 3, wherein an inclination angle of the probe body in relation to a bottom side of the reservoir is equal to or less than 25°.

7. The system according to claim 1, wherein the probe body is in the form of a beam or a rod or a wire or a sheet.

8. The system according to claim 1, wherein the probe body is made of metal or steel.

9. The system according to claim 1, wherein the probe body is reinforced in a section above the maximum filling level.

10. The system according to claim 1, wherein the temperature dependent sensor is mounted to the probe body at the second position of the probe body.

11. The system according to claim 10, wherein the temperature dependent sensor is a resistant thermometer.

12. The system according to claim 1, the system further comprising:
   a supply line for supplying the liquid into the reservoir, and
   a flow regulator for regulating a flow rate of the liquid into the reservoir, the controller being connected to the temperature dependent sensor and to the flow regulator for controlling the filling level of the reservoir by regulating the flow rate of the liquid into the reservoir depending on the sensor signal.

13. The system according to claim 1, wherein the liquid is a cryogenic liquid.

14. A microscope stage of a microscope including the system of claim 1.

* * * * *